UNITED STATES PATENT OFFICE.

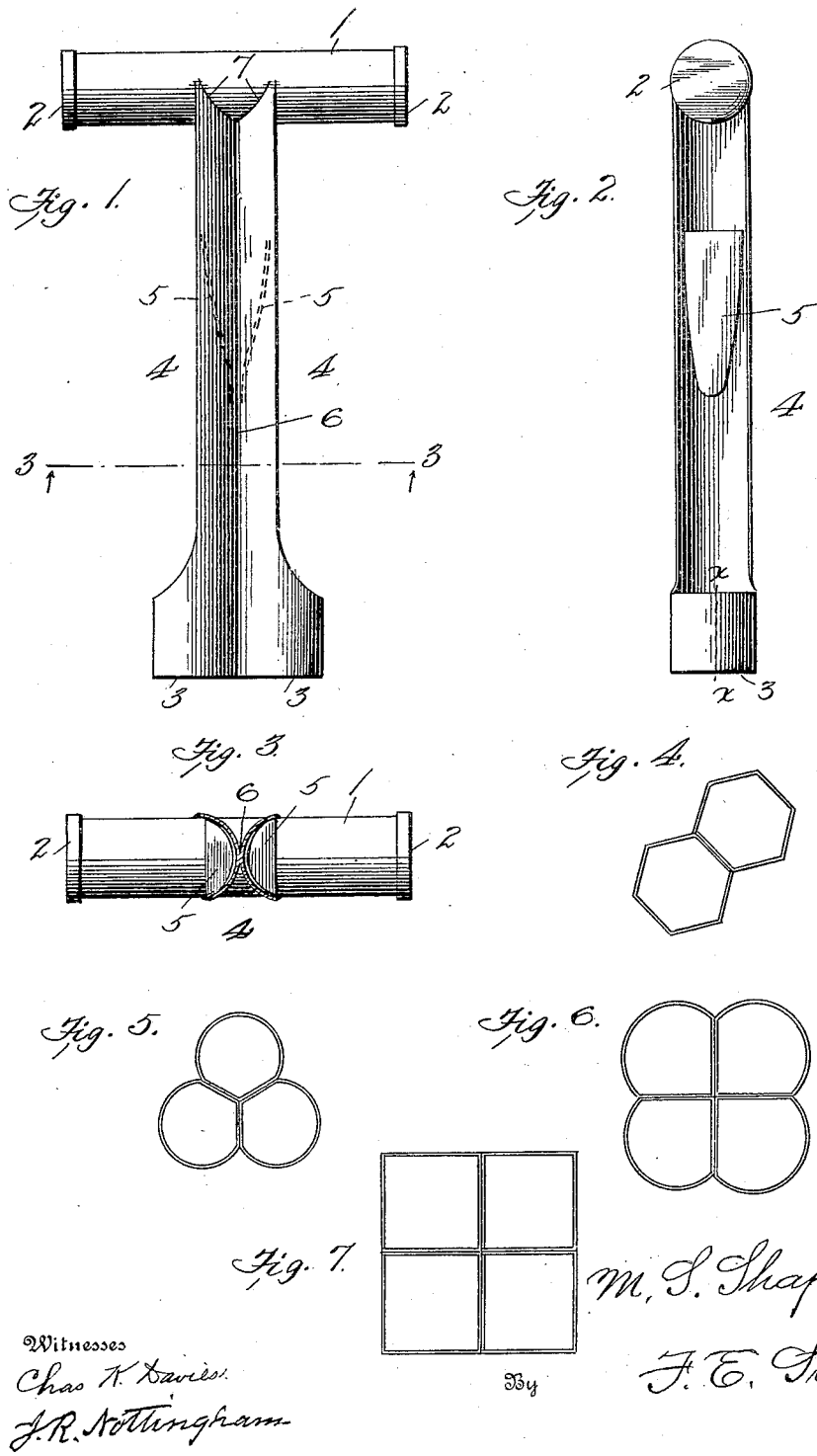

MARSHALL S. SHAPLEIGH, OF PLAINFIELD, NEW JERSEY.

CUTTER.

No. 917,497.      Specification of Letters Patent.      Patented April 6, 1909.

Application filed February 5, 1907. Serial No. 355,826.

*To all whom it may concern:*

Be it known that I, MARSHALL S. SHAPLEIGH, a citizen of the United States, residing at Plainfield, in the county of Union and State of New Jersey, have invented new and useful Improvements in Cutters, of which the following is a specification.

The object of my invention is the production of a tool or deivce which shall be adapted for easily and quickly cutting certain vegetables or fruits into a multiplicity of substantially cylindrical pieces, and especially for thus cutting potatoes preparatory to frying or otherwise cooking the same.

The invention consists in certain novelties of construction and combinations of parts hereinafter set forth and claimed.

The accompanying drawing illustrates one complete example and four modifications of the embodiment of the invention constructed according to the best modes I have so far devised for the practical application of the principle.

Figure 1 is a view in elevation of a double cutter. Fig. 2 is a side view. Fig. 3 is a section on line 3—3 of Fig. 1 looking toward the handle. Figs. 4, 5, 6 and 7 are bottom plan views of modified forms of the cutting tool showing in outline the shapes of the cutters.

Referring to Figs. 1, 2, and 3, the numeral 1 designates a metallic tubular handle; 2, caps which close the ends of the tube; 3, 3, two cylindrical cutters; 4, 4, the shanks which carry the cutters, each shank being concavo-convex in cross section and the arc less than a semi-circle so that the cut portions of a potato will not be held by frictional contact with the sides thereof; 5, deflectors which may be fastened within the concavities of the shanks by solder or otherwise when their presence in connection with the tool is desired; 6, the meeting surfaces of the cutters and shanks which in this instance are soldered together; and 7 designates the upper ends of the shanks where they are soldered or otherwise fastened to the handle.

Each shank and cutter may be manufactured by severing a blank of suitable shape from a piece of sheet metal, such as tin, pressing the part designed for the shank to a concavo-convex shape, and fashioning the lower end to a circular form and uniting the edges by solder on the line $x$—$x$. The entire device may also be cast integrally.

Fig. 4 shows the cutting edges of the device made angular—each of the two cutters being bounded by six sides.

Fig. 5 shows three cutters arranged about a common center.

Fig. 6 illustrates four cutters arranged about a common center.

Fig. 7 shows four cutters united, each cutter being square in plan and in cross section. The shanks which carry these several modified shapes of cutters may each be concavo-convex, as shown by Fig. 1, and the shanks be united by solder or otherwise to secure rigidity. A handle is located at the ends of the shanks as in Fig. 1.

In some cases I may make the cutting edge of less diameter than the tubular or angular portion of the cutter above the edge so that the cut pieces will be more readily delivered from the tube.

In use the cutters are successively forced through the potato or potatoes, and each successive act of cutting presses the cylinders previously cut toward the handle where they fall away from the shanks by gravity or are delivered outwardly therefrom by the deflectors, when deflectors are used.

What I claim is:

1. A tool having a handle, a plurality of concave shanks arranged back to back and secured to the handle, and a cutter at the end of each shank, each of said cutters being open at the top so the material cut can pass to the shank.

2. A tool having a plurality of cylindrical cutters, a handle, and a plurality of shanks each secured at one end to the handle and at right angles thereto and at the other end to a cutter; each of said shanks where it joins a cutter having a concave surface in line with the inner curved surface of a cutter, for the purpose set forth.

In testimony whereof I affix my signature in presence of two witnesses.

MARSHALL S. SHAPLEIGH.

Witnesses:
    ADOLPH A. SCHEUBER,
    JAMES W. CUDMORE.